United States Patent [19]
Goring et al.

[11] 3,912,813
[45] Oct. 14, 1975

[54] NEMATOCIDAL SOIL TREATING COMPOSITIONS COMPRISING 1,2-DIBROMO-3-CHLOROPROPANE AND O-PHENYL N,N'-DIMETHYL PHOSPHORODIAMIDATE

[75] Inventors: Cleve A. I. Goring, Walnut Creek; Charles R. Youngson, Concord, both of Calif.

[73] Assignee: The Dow Chemical Company, Midland, Mich.

[22] Filed: Oct. 31, 1974

[21] Appl. No.: 519,471

Related U.S. Application Data

[63] Continuation of Ser. No. 400,093, Sept. 24, 1973, abandoned.

[52] U.S. Cl. .................................. 424/220; 424/350
[51] Int. Cl.² ...................... A01N 9/30; A01N 9/36

[58] Field of Search ........................... 424/220, 350

[56] References Cited
UNITED STATES PATENTS
3,005,749  10/1961  Youngson ........................... 424/220
3,049,472  8/1962  Swezey .............................. 424/350

*Primary Examiner*—Albert T. Meyers
*Assistant Examiner*—Leonard Schenkman
*Attorney, Agent, or Firm*—S. Preston Jones

[57] ABSTRACT

Novel pesticidal compositions containing a mixture of 1,2-dibromo-3-chloropropane and O-phenyl N,N'-dimethyl phosphorodiamidate are disclosed. Such compositions are useful in the treating and disinfection of soil infested with nematodes, it having been found that the toxic ingredients of said compositions are mutually activating.

5 Claims, No Drawings

NEMATOCIDAL SOIL TREATING COMPOSITIONS COMPRISING 1,2-DIBROMO-3-CHLOROPROPANE AND O-PHENYL N,N'-DIMETHYL PHOSPHORODIAMIDATE

CROSS-REFERENCE TO RELATED APPLICATIONS

This is a continuation of application Ser. No. 400,093, filed Sept. 24, 1973, now abandoned.

BACKGROUND OF THE INVENTION

It is an object of this invention to provide new nematocidal compositions which are useful in the control in soil of nematodes and other invertebrate organisms which attack plant roots. A further object is to supply a new agronomic practice for improving the plant growing properties of soil and the ability of soil to support the growth of crops. Another object is the provision of a new method and composition for improving the emergence, seedling growth and the harvest of crop plants. A further object is the provision of a new method and composition for treating soil to obtain improved controls of soil-dwelling invertebrate organisms such as nematodes. An additional object is the provision of a new method and composition for treating soil which will accomplish the stimulation of the growth of crops.

PRIOR ART

The O-phenyl N,N'-dimethyl phosphorodiamidate employed in accordance with the teachings of the present invention and taught in U.S. Pat. No. 3,005,749, may be prepared by reacting one molar proportion of O-phenyl phosphorodichloroidate with at least four molar proportions of methylamine. The reaction is carried out in an inert reaction medium such as benzene and takes place at temperatures of from 0° to 40°C. with the production of the desired product and methylamine hydrochloride of reaction. Upon completion of the reaction, the reaction mixture is filtered to separate the hydrochloride and the solvent removed from the filtrate by distillation to obtain the O-phenyl N,N'-dimethyl phosphorodiamidate as a residue.

1,2-Dibromo-3-chloropropane employed in accordance with the present invention and taught in U.S. Pat. No. 3,049,472 may be prepared by the direct bromination of allyl chloride. The reaction is somewhat exothermic and takes place readily at temperatures of from 20° to 60°C. In carrying out the reaction, the bromine is added portionwise to the allyl chloride with stirring and with cooling, if required. Following reaction the desired product may be separated by fractional distillation under reduced pressure.

SUMMARY OF THE INVENTION

The new nematocidal compositions of the present invention comprise about 1 part by weight of O-phenyl N,N'-dimethyl phosphorodiamidate in admixture with from about 1 to 9 parts by weight of 1,2-dibromo-3-chloropropane. This composition conveniently adapts itself to the treatment of soil or other growth media to improve the ability of the soil to support plant growth and to benefit the plants grown in the treated soil. Such practice protects the plants from the ravages of soil-dwelling invertebrate organisms which attack their roots and improves the growth and harvest of crop plants. It has also been found that the treatment accomplishes changes in the soil which stimulate the growth and improve the growth characteristics of crops grown therein. It is among the advantages of the present invention that the toxicants in the mixture appear to be mutually activating so that a greater than additive or synergistic result is accomplished as regards the effect on the plant growing properties of the soil and the control of undesirable organisms and particularly invertebrates such as nematodes.

The composition comprising the mixture of toxicants is sufficiently increased in effectiveness so as to permit the effective utilization of reduced amounts of O-phenyl N,N'-dimethyl phosphorodiamidate and of 1,2-dibromo-3-chloropropane and the obtaining of crop yields and controls of soil-dwelling organisms which are much superior to those obtained when either of the constituents of the mixture is employed alone. An additional advantage is that these reduced effective dosages of the mixture of toxicants materially reduce the hazards of soil residues. Thus, the practice of the present invention provides a very desirable economic advantage for the agriculturalist.

1,2-Dibromo-3-chloropropane is a mobile liquid which boils at about 199°C. at atmospheric pressure, and O-phenyl N,N'-dimethyl phosphorodiamidate is a crystalline solid. Mixtures of the compounds are somewhat soluble in many organic solvents and of low solubility in water. They are adapted to be readily and conveniently distributed in soil. Further, when so employed, the compounds accomplish a substantially complete kill of nematodes, and induce soil changes which improve the ability of the soil to support plant growth and the growth characteristics of crops raised on the treated soil. It is among the advantages of the present invention that mixtures of these compounds, while sufficiently persistent to accomplish the desired effect upon the soil and upon the soil inhabiting organisms, dissipate in a reasonable period of time.

The distribution of at least a minimum effective dosage of the mixture of 1,2-dibromo-3-chloropropane and O-phenyl N,N'-dimethyl phosphorodiamidate in soil is essential and critical for the practice of the present invention. In general, good improvement in the ability of the soil to support plant growth and good controls of nematodes and other root attacking invertebrate organisms are obtained when said mixed compounds are distributed in soil in an amount of at least about 1 part by weight of the mixed compounds per million parts by weight of the soil. A good working range is from about 1 to about 3 parts by weight of the mixed compounds per million parts by weight of the soil.

In general field applications, it is usually preferred that the compounds be distributed in the soil to a depth of from 3 to 12 inches at rates of from about 1 to about 12 pounds per treated acre (one pound distribution through 3 inches of soil is approximately 1 part of the active compound per million parts of soil (ppm) and 12 pounds distribution through 12 inches of soil is approximately 3 ppm). Oftentimes it is desirable to distribute the compounds to a depth of as much as 48 inches at rates of as much as 48 pounds per treated acre to avoid reinfestation of the soil by deep dwelling nematodes which cause plant disease. Rates as low as ⅛ pound per overall acre (equivalent to 1 pound per treated acre) may be employed in row or band applications where the treated band in which the crop is seeded or transplanted occupies as little as one-eighth of the overall area on which the crop is being grown. When compositions embodying a liquid or solid carrier are used, as hereinafter described, the amount of the composition is adjusted to distribute substantially the above described amounts of the active toxicant mixture per acre.

In one embodiment of the invention, the treated soil is planted with the desired crop plant following the distribution of the toxicant compounds in the soil. Where minimum dosages of the toxicant compounds are distributed in soil, the treated soil may be immediately planted with the desired crop. Following the distribution of large dosages of the toxicant compounds, it is desirable that any planting operation not be carried out for a period of from several hours to several days, the exact period depending upon the concentration of the toxicant compounds in the soil and the resistance of the species concerned to the compounds. Where the mixture of toxicant compounds is employed for the treatment of the soil adjacent to the root system of established plants having resistance to the compounds and in side dressing operations, the existing vegetation is not unfavorably effected by minimum effective concentrations of the toxicant compounds temporarily present in the soil.

In carrying out the improved agronomic practice of the invention, the O-phenyl N,N'-dimethyl phosphorodiamidate and 1,2-dibromo-3-chloropropane may be mixed or ground together and the resulting product employed directly for the treatment of soil. However, the present method also embraces the employment of a liquid or dust composition wherein the mixed active compounds are applied to the soil in admixture with an inert adjuvant as a carrier. In such usage, the active compounds may be modified with one or a plurality of additaments or soil treating or parasiticide adjuvants, including water or other liquid carriers, surface active dispersing agents and finely divided inert solids. Depending on the concentration of toxicant compounds, such augmented compositions are adapted to be distributed in soil, or employed as concentrates and subsequently diluted with additional inert carrier to produce the ultimate treating compositions.

Liquid compositions containing the O-phenyl N,N'-dimethyl phosphorodiamidate and 1,2-dibromo-3-chloropropane in the desired amounts may be prepared by dissolving the compounds in a liquid organic carrier at ordinary temperatures. Suitable liquid organic carriers include liquid aliphatic and aromatic compounds such as acetone, toluene, xylenes, naphthas and hydrocarbon mixtures derived by the distillation of petroleum or coal. Depending on the concentration of the mixture of toxicants, such augmented compositions are adapted to be distributed in the soil or otherwise employed as concentrates and subsequently diluted with additional carrier to produce the ultimate treating compositions. Aqueous liquid compositions containing the desired amount of the mixture of toxicants in water can be prepared by dispersing the toxicants in water with the aid of a suitable surface active dispersing agent such as an ionic or non-ionic emulsifying agent. Such compositions may contain one or more water immiscible solvents for the mixture of toxicants, and in such compositions the carrier comprises an aqueous emulsion, i.e., a mixture of water immiscible solvent, emulsifying agent and water. Dispersing and emulsifying agents which can be employed in the compositions include the condensation products of alkylene oxides with phenols and organic acids, alkyl aryl sulfonates, polyoxyethylene derivatives of sorbitan esters, complex ether alcohols, mahogany soaps and the like. In another method, aqueous liquid compositions containing the mixture of toxicants can be prepared by dissolving said toxicants in a water miscible solvent such as acetone or methyl ethyl ketone and then diluting said solution with water to produce the ultimate treating compositions. These compositions may also include an ionic or non-ionic emulsifying agent, if desired.

In the preparation of dust compositions, the O-phenyl N,N'-dimethyl phosphorodiamidate and 1,2-dibromo-3-chloropropane compounds are dispersed in and on a finely divided inert solid such as talc, chalk, gypsum and the like. In such operations, the carrier is mechanically ground with the compound or wet with a volatile organic solvent solution thereof. Similarly, dust compositions containing the mixture of toxicants can be prepared from various of the solid, surface active dispersing agents, such as bentonite, fuller's earth, attapulgite and other clays. Depending on the proportions of ingredients, these dust compositions may be employed as concentrates and subsequently diluted with additional solid surface active dispersing agent or with talc, chalk or gypsum and the like to obtain the desired amount of the active compounds in a composition adapted to be employed for the treatment of soil. Also, such concentrate dust compositions may be dispersed in water with or without the aid of a dispersing agent to form aqueous soil treating compositions.

In formulating the compositions, it is essential to maintain the proportions of from about 1 part by weight of O-phenyl N,N'-dimethyl phosphorodiamidate to from 1 to 9 parts by weight of 1,2-dibromo-3-chloropropane and to provide an effective amount of said mixture in the finished composition in order to maintain the desired synergistic effect. The concentration of the mixture of toxicants in liquid compositions employed to supply the desired dosage generally is from about 0.00001 to 50 percent by weight, although compositions employing as high as 90 percent may be employed. In dusts, the concentration of the mixture of toxicants may be from about 0.08 to 20 percent by weight. In compositions to be employed as concentrates, the mixture of toxicants may be present in a concentration of from about 5 to 95 percent by weight.

When operating in accordance with the present invention, the soil may be impregnated with the mixture of toxicant compounds, or a composition containing the toxicants, in any convenient fashion, e.g., by simple mixing with the soil, by applying to the surface of soil and thereafter dragging or disking into the soil to the desired depth, or by employing water to accomplish the penetration and impregnation. In a preferred procedure, the impregnation is carried out with the water employed to irrigate the soil.

The expressions "growth media" or "soil" are employed in the present specification and claims in their broadest sense to be inclusive of all conventional "soils," as defined in Webster's New International Dictionary, Second Edition, Unabridged, published in 1937 by G. and C. Merriam Company, Springfield, Mass. Thus, the terms refer to any substances or media in which vegetation may take root and grow, and are intended to include not only earth but compost, manure, muck, humus, and sand and the like, adapted to support plant growth.

DESCRIPTION OF THE PREFERRED EMBODIMENTS

The following examples illustrate the invention but are not to be construed as limiting the same.

EXAMPLE 1

Acetone solutions variously containing from about 0.6 to 1.3 parts per million per weight of O-phenyl N,N'-dimethyl phosphorodiamidate and 1,2-dibromo-3-chloropropane in a ratio of 1 part O-phenyl N,N'-dimethyl phosphorodiamidate to 1 part of 1,2-dibromo-3-chloropropane are dispersed in water to produce the following aqueous compositions:

| Composition | Concentration of toxicant in parts by weight per million parts by weight of composition | |
|---|---|---|
| | O-phenyl N,N'-dimethyl phosphorodiamidate | 1,2-dibromo-3--chloropropane |
| A | 0.63 | — |
| B | — | 0.63 |
| C | 0.63 | 0.63 |

These compositions are employed for the treatment of seed beds of sandy loam soil heavily infested with root knot nematodes. In the treating operations, the aqueous compositions are applied as a soil drench to the seed beds.

Following the above treatment, the seed beds are maintained in a high humidity room at 70°F. for 7 days and then planted with cucumber seeds. Adjacent seed beds of the same infested soil, processed in the same fashion but using an aqueous composition free of any toxicant, are also planted with cucumber seeds to serve as checks. During the subsequent growing season there is observed no adverse effect upon the germination and growth of the seedlings attributable to the presence of the toxicants or toxicant mixture. About 3 weeks after planting, the plants are lifted from the soil and the roots washed and examined for gall formation attributable to nematode attack. The results obtained, together with the dosages at which the toxicants are employed, are set forth in the following table:

Table I

| Composition | Dosage of toxicant in parts per million parts of soil | | Actual percent control of Nematodes |
|---|---|---|---|
| | O-phenyl N,N'--dimethyl phos-phorodiamidate | 1,2-dibromo--3-chloro-propane | |
| A | 0.63 | — | 56 |
| B | — | 0.63 | 0 |
| C | 0.63 | 0.63 | 100[(1)(2)] |

[(1)]Predicted control of nematodes when employing 0.63 parts per million parts of soil of each toxicant was 62 percent compared to the 100 percent control actually observed; and was determined by method of Wadley, hereinafter cited.
[(2)]Equivalent amount of 1,2-dibromo-3-chloropropane alone necessary to give the above predicted 62 percent control was found to be 4.63 parts per million parts of soil.

In the check plots which receive no treatment, the plants are found to be dwarfed and their roots covered with galls attributable to nematode attack.

EXAMPLE 2

Acetone solutions variously containing from about 0.3 to 1.3 percent by weight of O-phenyl N,N'-dimethyl phosphorodiamidate and 1,2-dibromo-3-chloropropane in a ratio of 1 part of O-phenyl N,N'-dimethyl phosphorodiamidate to 3 parts of 1,2-dibromo-3-chloropropane are dispersed in water to produce the following aqueous compositions:

| Composition | Concentration of toxicant in parts by weight per million parts by weight of composition | |
|---|---|---|
| | O-phenyl N,N'-dimethyl phosphorodiamidate | 1,2-dibromo-3--chloropropane |
| A | 0.31 | — |
| B | — | 0.94 |
| C | 0.31 | 0.94 |

These compositions are employed for the treatment of seed beds of sandy loam soil heavily infested with root knot nematodes. In the treating operations, the aqueous compositions are applied as a soil drench to the seed beds.

Following the above treatment, the seed beds are maintained in a high humidity room at 70°F. for 7 days and then planted with cucumber seeds. Adjacent seed beds of the same infested soil, processed in the same fashion but using an aqueous composition free of any toxicant, are also planted with cucumber seeds to serve as checks. During the subsequent growing season there is observed no adverse effect upon the germination and growth of the seedlings attributable to the presence of the toxicants or toxicant mixture. About 3 weeks after planting, the plants are lifted from the soil and the roots washed and examined for gall formation attributable to nematode attack. The results obtained, together with the dosages at which the toxicants are employed, are set forth in the following table:

Table II

| Composition | Dosage of toxicant in parts per million parts of soil | | Actual percent control of Nematodes |
|---|---|---|---|
| | O-phenyl N,N'--dimethyl phos-phorodiamidate | 1,2-dibromo--3-chloro-propane | |
| A | 0.31 | — | 33 |
| B | — | 0.94 | 0 |
| C | 0.31 | 0.94 | 75[(1)(2)] |

[(1)]Predicted control of nematodes when employing the indicated amount of each toxicant was 55 percent compared to the 75 percent control actually observed; and was determined by method of Wadley, hereinafter cited.
[(2)]Equivalent amount of 1,2-dibromo-3-chloropropane alone necessary to give the above predicted 55 percent control was found to be 3.94 parts per million parts of soil.

In the check plots which receive no treatment, the plants are found to be dwarfed and their roots covered with galls attributable to nematode attack.

EXAMPLE 3

Acetone solutions variously containing from about 0.1 to 1.3 percent by weight of O-phenyl N,N'-dimethyl phosphorodiamidate and 1,2-dibromo-3-chloropropane in a ratio of 1 part of O-phenyl N,N'-dimethyl phosphorodiamidate to 9 parts of 1,2-dibromo-3-chloropropane are dispersed in water to produce the following aqueous compositions:

| Composition | Concentration of toxicant in parts by weight per million parts by weight of composition | |
|---|---|---|
| | O-phenyl N,N'-dimethyl phosphorodiamidate | 1,2-dibromo-3-chloropropane |
| A | 0.13 | — |
| B | — | 1.13 |
| C | 0.13 | 1.13 |

These compositions are employed for the treatment of seed beds of sandy loam soil heavily infested with root knot nematodes. In the treating operations, the aqueous compositions are applied as a soil drench to the seed beds.

Following the above treatment, the seed beds are maintained in a high humidity room at 70°F. for 7 days and then planted with cucumber seeds. Adjacent seed beds of the same infested soil, processed in the same fashion but using an aqueous composition free of any toxicant, are also planted with cucumber seeds to serve as checks. During the subsequent growing season there is observed no adverse effect upon the germination and growth of the seedlings attributable to the presence of the toxicants or toxicant mixture. About 3 weeks after planting, the plants are lifted from the soil and the roots washed and examined for gall formation attributable to nematode attack. The results obtained, together with the dosages at which the toxicants are employed, are set forth in the following table:

Table III

| Composition | Dosage of toxicant in parts per million parts of soil | | Actual percent control of Nematodes |
|---|---|---|---|
| | O-phenyl N,N'-dimethyl phosphorodiamidate | 1,2-dibromo-3-chloropropane | |
| A | 0.13 | — | 27 |
| B | — | 1.13 | 0 |
| C | 0.13 | 1.13 | 60[1,2] |

[1]Predicted control of nematodes when employing the indicated amount of each toxicant was 38 percent compared to the 60 percent control actually observed; and was determined by method of Wadley, hereinafter cited.
[2]Equivalent amount of 1,2-dibromo-3-chloropropane alone necessary to give the above predicted 38 percent control was found to be 3.20 parts per million parts of soil.

(1) Predicted control of nematodes when employing the indicated amount of each toxicant was 38 percent compared to the 60 percent control actually observed; and was determined by method of Wadley, hereinafter cited. (2) Equivalent amount of 1,2-dibromo-3-chloropropane alone necessary to give the above predicted 38 percent control was found to be 3.20 parts per million parts of soil.

In the check plots which receive no treatment, the plants are found to be dwarfed and their roots covered with galls attributable to nematode attack.

Data from Tables I, II, and III illustrate that better nematode control was obtained employing the two toxicants than would be expected. Also, less of the mixture of toxicants is necessary to give more than an additive result. The total amount of the mixture is also less than the amount of 1,2-dibromo-3-chloropropane necessary to give the predicted degree of control of the nematode. These data are obtained according to the technique described in Wadley, "The Evidence Required to Show Synergistic Action of Insecticides and a Short Cut in Analysis," U.S. Department of Agriculture Publication; EP-223; June 1945.

EXAMPLE 4

In other operations, aqueous compositions containing various amounts of O-phenyl N,N'-dimethyl phosphorodiamidate and 1,2-dibromo-3-chloropropane, as the sole toxicant components and emulsifying agents were found to give nematocidal effects far greater than the results obtained when employing either of the toxicants alone at the same toxicant rate. The following table sets forth the various compositions:

Table IV

| Parts per million of active Component | |
|---|---|
| O-phenyl N,N'-dimethyl phosphorodiamidate | 1,2-dibromo-3-chloropropane |
| 0.41 | 1.23 |
| 0.54 | 1.63 |
| 0.22 | 1.95 |
| 0.29 | 2.58 |
| 0.72 | 2.15 |
| 0.38 | 3.39 |
| 0.94 | 2.83 |
| 0.48 | 0.48 |
| 0.82 | 0.82 |
| 1.09 | 1.09 |
| 1.44 | 1.44 |

What is claimed is:

1. A synergistic nematocidal composition for use in soil for the control of plant root attacking nematodes which comprises a mixture of toxicants consisting of about 1 part by weight of O-phenyl N,N'-dimethyl phosphorodiamidate and from about 1 to about 9 parts by weight of 1,2-dibromo-3-chloropropane, said mixture being in intimate admixture with an inert carrier therefor in an amount of from about 0.00001 to 90 percent by weight of the total composition.

2. The composition as defined in claim 1 wherein the carrier is an inert liquid organic carrier.

3. The composition as defined in claim 2 wherein the composition is present as an aqueous dispersion and the mixture of toxicants is present in an amount of from about 0.00001 to 50 percent by weight of the total composition.

4. A method for killing nematodes in soil which comprises impregnating said soil with an active toxicant mixture in an amount of from about 1 to about 3 parts by weight of said active toxicant mixture per million parts of the soil, said active toxicant mixture comprising about 1 part by weight of O-phenyl N,N'-dimethyl phosphorodiamidate and from about 1 to about 9 parts by weight of 1,2-dibromo-3-chloropropane, said active toxicant mixture being in intimate admixture with an inert carrier therefor.

5. The method as defined in claim 4 wherein the mixture is in the form of an aqueous dispersion and wherein the active toxicant mixture is present in the dispersion in an amount of from about 0.00001 to 50 percent by weight of the aqueous dispersion.

* * * * *